US011200376B2

(12) United States Patent
Bull et al.

(10) Patent No.: US 11,200,376 B2
(45) Date of Patent: Dec. 14, 2021

(54) EXPANDED CONCEPT MATCHING

(71) Applicant: INTERNATIONAL BUSINESS MACHINES CORPORATION, Armonk, NY (US)

(72) Inventors: Brendan Bull, Durham, NC (US); Paul Lewis Felt, Springville, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/545,014

(22) Filed: Aug. 20, 2019

(65) Prior Publication Data

US 2021/0056171 A1 Feb. 25, 2021

(51) Int. Cl.
*G06F 40/279* (2020.01)
*G06F 16/35* (2019.01)
(Continued)

(52) U.S. Cl.
CPC .......... *G06F 40/279* (2020.01); *G06F 16/355* (2019.01); *G06F 16/367* (2019.01); *G06F 40/117* (2020.01); *G06F 40/247* (2020.01)

(58) Field of Classification Search
CPC .. G06F 40/30; G06F 16/9024; G06F 16/2246; G06F 16/24578; G06F 16/285; G06F 16/367; G06F 16/9017; G06F 16/9027; G06F 16/35; G06F 16/353; G06F 16/36; G06F 16/9038; G06F 16/906; G06F 40/284; G06F 16/2237; G06F 16/2264; G06F 16/322; G06F 16/3344; G06F 16/3347; G06F 16/45; G06F 16/55; G06F 16/65; G06F 17/15; G06F 17/153; G06F 40/56; G06K 9/6267; G06K 9/6215; G06K 9/6201; G06K 9/627; G06K 9/628; G06K 9/6282; G06K 9/6892
See application file for complete search history.

(56) References Cited

U.S. PATENT DOCUMENTS 6,556,964 B2 * 4/2003 Haug .................... G06F 40/216
704/9
6,711,585 B1 * 3/2004 Copperman .......... G06F 16/367
(Continued)

OTHER PUBLICATIONS

C. Friedman et al, "Automated encoding of clinical documents based on natural language processing", Journal of the American Medical Informatics Association: JAMIA, vol. 11.5, 2004, pp. 392-402.

(Continued)

*Primary Examiner* — Linda Wong
(74) *Attorney, Agent, or Firm* — Cantor Colburn LLP; Ryan Lewis (57) ABSTRACT

Methods, systems, and computer program products for expanded concept matching are provided. Aspects include receiving an ontology, determining a set of target concepts, building a cache from the ontology, the cache comprising a set of expressions extracted from the ontology for each target concept in the set of target concepts, receiving a document, determining a first segment of text in the document based on the set of target concepts, and annotating the first segment of text by comparing the set of target concepts to the set of expressions in the cache.

14 Claims, 9 Drawing Sheets

(51) Int. Cl.
  *G06F 16/36* (2019.01)
  *G06F 40/247* (2020.01)
  *G06F 40/117* (2020.01)

(56) References Cited

U.S. PATENT DOCUMENTS

| | | | |
|---|---|---|---|
| 7,668,737 | B2 | 2/2010 | Streepy, Jr. |
| 9,542,647 | B1 | 1/2017 | Mirhaji |
| 10,740,678 | B2 * | 8/2020 | Ho .................. G06F 16/367 |
| 2009/0070103 | A1 | 3/2009 | Beggelman et al. |
| 2015/0149215 | A1 * | 5/2015 | Qian .................. G16H 70/20 |
| | | | 705/3 |
| 2016/0019356 | A1 | 1/2016 | Martin et al. |
| 2018/0330807 | A1 * | 11/2018 | Oliveira ............. G16H 40/63 |
| 2018/0357307 | A1 * | 12/2018 | Sevenster ........... G16H 50/70 |
| 2018/0373701 | A1 * | 12/2018 | McAteer ............ G06F 16/9024 |
| 2019/0114304 | A1 * | 4/2019 | Oliveira ............. G06F 16/285 |
| 2019/0182382 | A1 * | 6/2019 | Mazza ................ G10L 15/26 |
| 2019/0310981 | A1 * | 10/2019 | Sevenster .......... G06F 16/2465 |
| 2020/0004832 | A1 * | 1/2020 | Juric ................... G06F 16/243 |
| 2020/0042523 | A1 * | 2/2020 | Mirhaji .............. G06F 16/3344 |

OTHER PUBLICATIONS

C. Lin et al, "Automatic Prediction of Rheumatoid Arthritis Disease Activity from the Electronic Medical Records", PLoS ONE, 8(8), 2013, 10 pages.

K. Roberts et al, "A flexible framework for deriving assertions from electronic medical records", Journal of the American Medical Informatics Association, vol. 18, No. 5, Sep. 2011, pp. 568-573.

T. Cai et al., "Natural Language Processing Technologies in Radiology Research and Clinical Applications", Radiographics 2016, vol. 36, No. 1, pp. 176-191.

Y. Kim et al, "Stacked Generalization for Medical Concept Extraction from Clinical Notes", Proceedings of the 2015 Workshop on Biomedical Natural Language Processing (BioNLP), Jul. 30, 2015, Beijing, China, pp. 61-70.

* cited by examiner

```
<entry cui="C0238656">
<surfaceform text="Ankle pain" tty="PT" vocab="HPO" vocabId="" />
<surfaceform text="Ankle pain" tty="SY" vocab="HPO" vocabId="" />
<surfaceform text="Ankle pain" tty="PT" vocab="SNOMEDCT_US" vocabId="247373008" />
<surfaceform text="pain ankle" tty="SY" vocab="CHV" vocabId="0000024081" />
<surfaceform text="PAIN ANKLE" tty="GT" vocab="CST" vocabId="" />
<surfaceform text="ANKLE PAIN" tty="FI" vocab="DXP" vocabId="" />
<surfaceform text="ankle pain" tty="PT" vocab="CHV" vocabId="0000024081" />
<surfaceform text="ankle pains" tty="SY" vocab="CHV" vocabId="0000024081" />
<surfaceform text="ankles pain" tty="SY" vocab="CHV" vocabId="0000024081" />
<surfaceform text="pain in ankle" tty="SY" vocab="CHV" vocabId="0000024081" />
<surfaceform text="Arthralgia of ankle" tty="PTCS" vocab="SNOMEDCT_US" vocabId="202490009" />
<surfaceform text="Ankle arthralgia" tty="SY" vocab="OMIM" vocabId="" />
<surfaceform text="Ankle joint pain" tty="PT" vocab="SNOMEDCT_US" vocabId="202490009" />
<surfaceform text="ankles painful" tty="SY" vocab="CHV" vocabId="0000024081" />
<surfaceform text="painful ankle" tty="SY" vocab="CHV" vocabId="0000024081" />
<surfaceform text="Ankle joint pain (finding)" tty="FN" vocab="SNOMEDCT_US" vocabId="202490009" />
<surfaceform text="Ankle pain (finding)" tty="FN" vocab="SNOMEDCT_US" vocabId="247373008" />
</entry>
```

Stomach - [(u'stomach_wall', 0.7665420174598694), (u'duodenum', 0.7542880773544312), (u'part_of_the_stomach', 0.7399175167083374), (u'stomach_and_duodenum', 0.7376461029052734), (u'esophagus_and_stomach', 0.7365366816520691), (u'pyloric_antrum', 0.7220067381858826), (u'esophagus', 0.7217645645141602), (u'digestive_tract', 0.7200971841812134), (u'pyloric_region', 0.7190411109085083), (u'small_intestine', 0.7133272290229797)]

Intestines - [(u'intestine', 0.8580181002616882), (u'small_intestines', 0.8566300086988037), (u'large_intestine', 0.8320499658584595), (u'small_intestine', 0.8183410763740540), (u'large_intestines', 0.8110367059707642), (u'intestinal_tract', 0.7919526696205139), (u'digestive_tract', 0.7356776595115662), (u'intestinal_contents', 0.7322170734405518), (u'gastro_intestinal_tract', 0.7166867256164551), (u'intestinal_mucosa', 0.7042851448059082)]

Tumor - [(u'tumour', 0.8473735451698303), (u'tumors', 0.8309990763664246), (u'primary_tumor', 0.8255770206451416), (u'tumor_mass', 0.7583931684494019), (u'metastatic_tumor', 0.7515406608581543), (u'tumor_cells', 0.7374743223190308), (u'tumor_cell', 0.7313276529312134), (u'tumoral', 0.7187654972076416), (u'tumor_tissue', 0.7183107137680054), (u'metastasis', 0.7177308797836304)]

```
"cui": "C0038356",
"preferredName": "Stomach Neoplasms",
"begin": 39,
"end": 60,
"coveredText": "tumors in his stomach",
"fuzzyConceptData": {
    "confidence": 1,
```

```
"cui": "C0017185",
"preferredName": "Gastrointestinal Neoplasms",
"begin": 39,
"end": 75,
"coveredText": "tumors in his stomach and intestines",
"fuzzyConceptData": {
    "confidence": 1,
```

EXPANDED CONCEPT MATCHING

BACKGROUND

The present invention generally relates to concept matching, and more specifically, to expanded concept matching for annotating unstructured text.

Natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input.

One particular area of NLP includes the annotation of unstructured textual documents with concepts that are relevant to the documents. Typically, concept matching techniques rely on dictionaries to match a textual expression to concepts. However, because dictionaries have limited ways of expressing concepts, it can be a challenge to match concepts to unstructured text due to the variety of ways an expression and be written and conveyed.

SUMMARY

Embodiments of the present invention are directed to a computer-implemented method for expanded concept matching. A non-limiting example of the computer-implemented method includes receiving an ontology, determining a set of target concepts, building a cache from the ontology, the cache comprising a set of expressions extracted from the ontology for each target concept in the set of target concepts, receiving a document, determining a first segment of text in the document based on the set of target concepts, and annotating the first segment of text by comparing the set of target concepts to the set of expressions in the cache.

Embodiments of the present invention are directed to a system for expanded concept matching. A non-limiting example of the system includes a processor configured to perform receiving an ontology, determining a set of target concepts, building a cache from the ontology, the cache comprising a set of expressions extracted from the ontology for each target concept in the set of target concepts, receiving a document, determining a first segment of text in the document based on the set of target concepts, and annotating the first segment of text by comparing the set of target concepts to the set of expressions in the cache.

Embodiments of the invention are directed to a computer program product for expanded concept matching, the computer program product comprising a computer readable storage medium having program instructions embodied therewith. The program instructions are executable by a processor to cause the processor to perform a method. A non-limiting example of the method includes receiving an ontology, determining a set of target concepts, building a cache from the ontology, the cache comprising a set of expressions extracted from the ontology for each target concept in the set of target concepts, receiving a document, determining a first segment of text in the document based on the set of target concepts, and annotating the first segment of text by comparing the set of target concepts to the set of expressions in the cache.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts the results of a basic concept data mining from an existing ontology according to one or more embodiments of the invention;

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure that includes a network of interconnected nodes.

Figure 1:
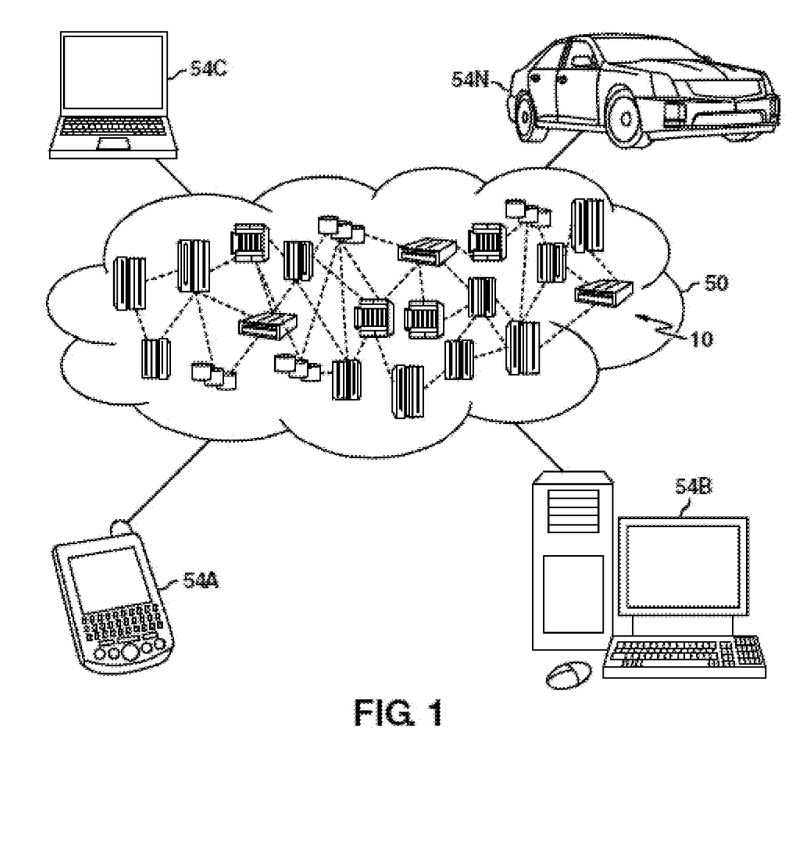
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
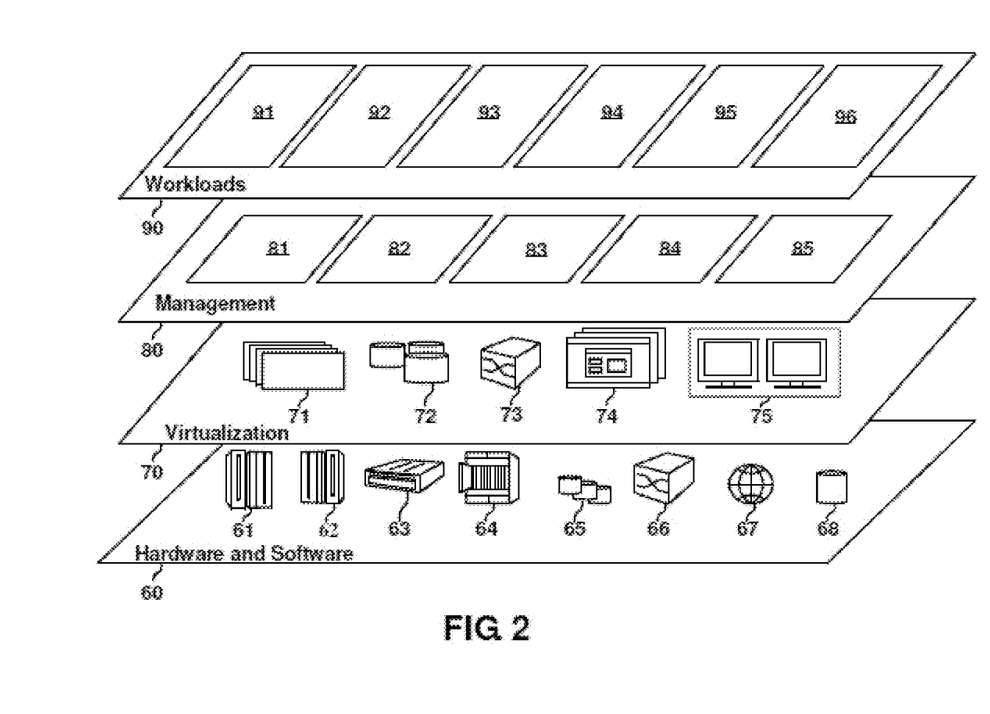
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and expanded concept matching 96.

Figure 3:
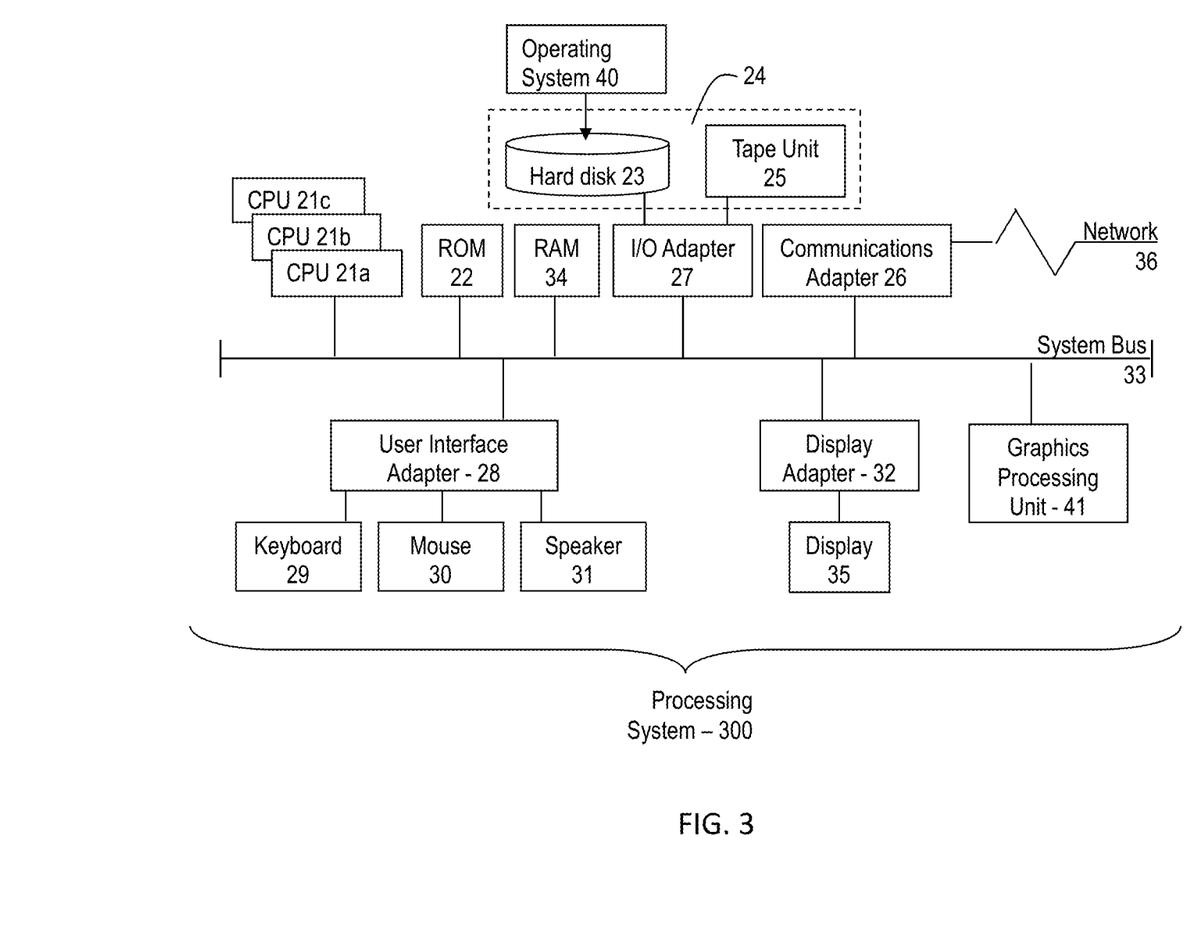
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system which coordinates the functions of the various components shown in FIG. 3.

Turning now to an overview of technologies that are more specifically relevant to aspects of the invention, concept matching is a field of technology that utilizes natural language processing techniques to analyze unstructured text documents and match certain concepts to textual expressions found in the documents. These textual expressions are sometimes referred to as surface forms. Typical concept matching engines primarily rely on dictionaries for matching concepts to surface forms. For medical documents, a concept detection engine may attempt to match the concept, "myocardial infarction," with a unique concept ID (cui). The concept of "myocardial infarction" might include surface forms such as "heart attack" and other similar descriptions. When these surface forms appear in a medical document, the document can then be annotated with the CUI.

However, a challenge exists with matching medical concepts, in particular, to a CUI due to medical concepts being expressed in a variety of different ways. Because of this, identifying all the surface forms related to a medical concept can be a challenge. For example, a concept such as "Ankle Fractures" can be expressed in text in multiple forms such as, for example, "broke my angle," "busted anklebone," "angle got fractured," "my ankle—yes, the same one as before—got broken," and "creatinine both at Durham regional and Mayo Clinic was elevated."

Turning now to an overview of the aspects of the invention, one or more embodiments of the invention address the above-described shortcomings of the prior art by providing a concept matching engine for annotating documents when facing syntax and synonym variants. Embodiments of the invention provide a concept matching engine that allows for normalized concepts to be detected and annotated without being explicitly included in a dictionary or reference.

Figure 4:
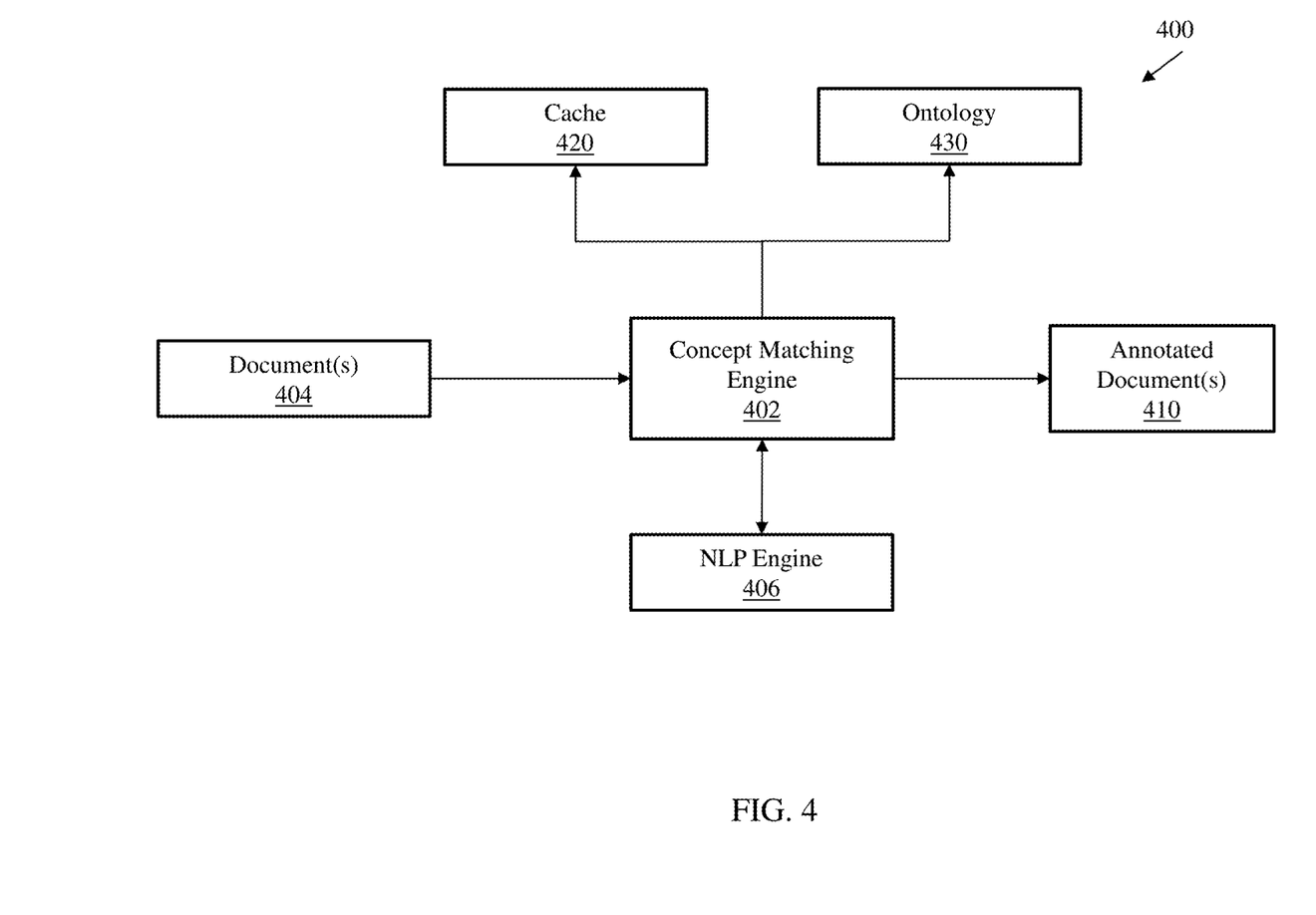
FIG. 4 depicts a system for expanded concept matching according to embodiments of the invention.

Turning now to a more detailed description of aspects of the present invention, FIG. 4 depicts a system for expanded concept matching according to embodiments of the invention. The system 400 includes a concept matching engine 402, an NLP engine 406, a cache 420, and an ontology 430. As described above, the concept matching engine 402 can receive documents 404 (typically, unstructured) and create annotations for these documents and output annotated document(s) 410 (i.e., an annotated version of the initial document(s) 404). In one or more embodiments of the invention, the concept matching engine 402 utilizes the cache 420 to expand concept matching for the unstructured documents 404 and the cache 420 is normalized for a specific matching application. For example, for medical applications where the unstructured documents 404 can be medical records of a patient. The concept matching engine 402 can define a group of concepts for data mining of an existing ontology 430. The existing ontology 430, in this example, can be a medical dictionary such as the Unified Medical Language System (UMLS). This data mining can be done by semantic type. Semantic types (sometimes referred to as semtypes, semantic concepts, and semantic categories) refer to concepts associated with natural language surface forms. For example, a surface form such as arm can be associated with the semantic type for body part, appendage, and/or limb.

In one or more embodiments, the concept matching engine 402 can define a group of target concepts that are of interest for data mining. For example, a target concept in a medical document can be "diseases." The concept matching engine 402 can then define a set of target semtypes that contain triggers for the concepts that are of interest for the data mining. For example, if "brain metastases" is in the set of CUIs that are of interest for data mining, the concept matching engine 402 can identify "brain" as the root target and "metastases" as the modifier. With a target concept of "diseases," the concept matching engine 402 can choose the target of semtypes of "BodyParts" and "BodySubstances" (like blood, cholesterol, etc.) as a starting point for data mining. The NLP engine 406 can extract modifiers from the natural language of the document(s) 404 input. An example extraction technique includes a rules engine on top of a syntax parse tree.

In one or more embodiments of the invention, given a target concept, the concept matching engine 402 can return any other parts of an unstructured text that modify the target concept. For example, consider the following phrase:

"The patient has pain and swelling in their ankle."

Given ankle as a body part target, the concept matching engine 402 can return "pain" and "swelling" as the modifiers. The modifiers can be expressed in a variety of ways including, but not limited to, adjectives, adverbs, prepositional phrases, and the like. In one or more embodiments of the invention, the concept matching engine 402 can utilize a variety of techniques including a tagging recurrent neural network (RNN) or other learned approaches and also, as mentioned above, a set of rules can be utilized.

In one or more embodiments of the invention, the concept matching engine 402 can apply this set of rules the existing ontology 430 and build a mapping of target/modifier combinations to concepts (the target/modifier combinations can sometimes be referred to as target-modifier pairs or targets) The targets can have one or more associated modifiers.

FIG. 5 depicts the results of a basic concept data mining from an existing ontology according to one or more embodiments of the invention. The results 500 are taken from a basic concept data mining of the UMLS as the ontology 430. The results 500 provide reasonable coverage of concepts; however, because of the multitude of variations in expressing the same concept, it is difficult to have complete coverage from just the results 500 shown in FIG. 5. For example, some variations in expressing ankle pain can include "pain in her ankle," "his ankle hurts," "lingering soreness in the ankle after the injury," and the like. Enumerating all of these variations across a large target space like diseases, pathologic functions, or procedures would be a challenge. Instead, the system 400 utilizes the results 500 as an initial starting point for expansion.

In one or more embodiments of the invention, concept matching engine 402 can apply data mining rules to the ontology 430 to create a mapping of targets/modifiers. As mentioned above, certain semantic types are going to be of higher value for data mining such as, for example, body parts or body substances. Utilizing basic dictionary matching, the concept matching engine 402 can identify semantic types in base surface forms. Then, the concept matching engine 402 can utilize defined syntax mining rules to find modifiers that describe the targets and then store this information in the cache 420. In the cache 420, targets can have multiple modifiers that map to concepts. For example, "posttraumatic head ache" is defined by one target (i.e., head) and two modifiers (i.e., posttraumatic and ache). In this case, the concept matching engine 402 would annotate the concept if there are good matches found for both modifiers relative to the target at inference time. Finding good matches can be done utilizing distance metrics, word embeddings, and the like.

When defining a group of target concepts, a determination can be made as to what concepts contain any clinical relevance, in the case of analyzing medical documentation. For example, a target concept in a medical document can be "diseases." The target concepts are typically selected based on whether the concepts include any clinical relevance. For example, procedures and diseases are things that both medical researchers and insurance companies would find of interest and would like better coverage over. Also, concepts that are "findings like" can be useful. The concept matching engine 402 can then define a set of target semtypes that contain triggers for the concepts that are of interest for the data mining.

For example, "brain metastases" is a target concept (i.e., of interest) because it is a disease type. When building the cache 420, there are going to be entries for the "Brain metastasis" CUI that attempts to enumerate all the ways that "brain metastasis" is expressed in the ontology 430. Any entry in the cache 420 is created where a target (e.g., "brain") and all of the various modifiers for it can be mapped to the CUI for "brain metastasis" which is C0220650. Now consider the following text: "The scans showed metastasis in the left side of the brain." Here, the term "brain" is something of interest and can be annotated by the concept matching engine 402 to body part. As such, body parts are good candidates for having compound ideas with appropriate modifiers. Utilizing parsing rules, the NLP engine 406 can extract items from the sentence that modify "brain." In this example, the extracted items can include "metastasis" and "left side" as possible candidates for modifiers. With this information, the concept matching engine 402 can search the cache 420 for "brain|metastasis" and "brain|left side." Certain concepts can be excluded based on the context of the text. For example, the concept for "tachycardia" might be expressed as "rapid"+"heart"+"beating". So, if the concept matching engine sees "his heart was beating", it would not be annotated with tachycardia. However, if the concept matching engine 402 saw "his heart was beating rapidly", the concept matching engine 402 could annotate that as tachycardia.

In one or more embodiments of the invention, the concept matching engine 402 can be adjusted utilizing a few techniques such as, for example, synonym definitions. Often times, there are multiple ways to express a concept and certain words should be treated as similar beyond what something like word embedding similarity returns. An example includes the following word groups of "dysfunction," "abnormality," "deviation," and "anomaly." Also, consider the word groups of "belly," "stomach," "abdomen," and "abdominal." Utilizing reasonable synonym sets allows for greater inference time coverage than what a standard ontology might provide with the provided surface forms. In addition, antonym definitions can be utilized to improve system 400 precision. Allowing the system 400 to have a set of words that are incompatible (not just purely antonymous) allows for the ability to drop a large set of false positives that word embedding distance might return as results. An example antonym group includes "able" and "can." Where the antonyms returned include "unable," "difficulty," "cannot," "can't," and "couldn't." Another technique for expanding system 400 precision includes colloquial language overrides. This can be utilized when the language being analyzed is informal. For example, consider the following phrase, "I tweaked my knee and it's been hurting for 2 weeks, should I see a doctor?" The system 400 can learn mappings from colloquial language to more formal language (e.g., tweak means hurt/injured). This colloquial to formal language mapping expands the types of useful interactions.

Figure 6:
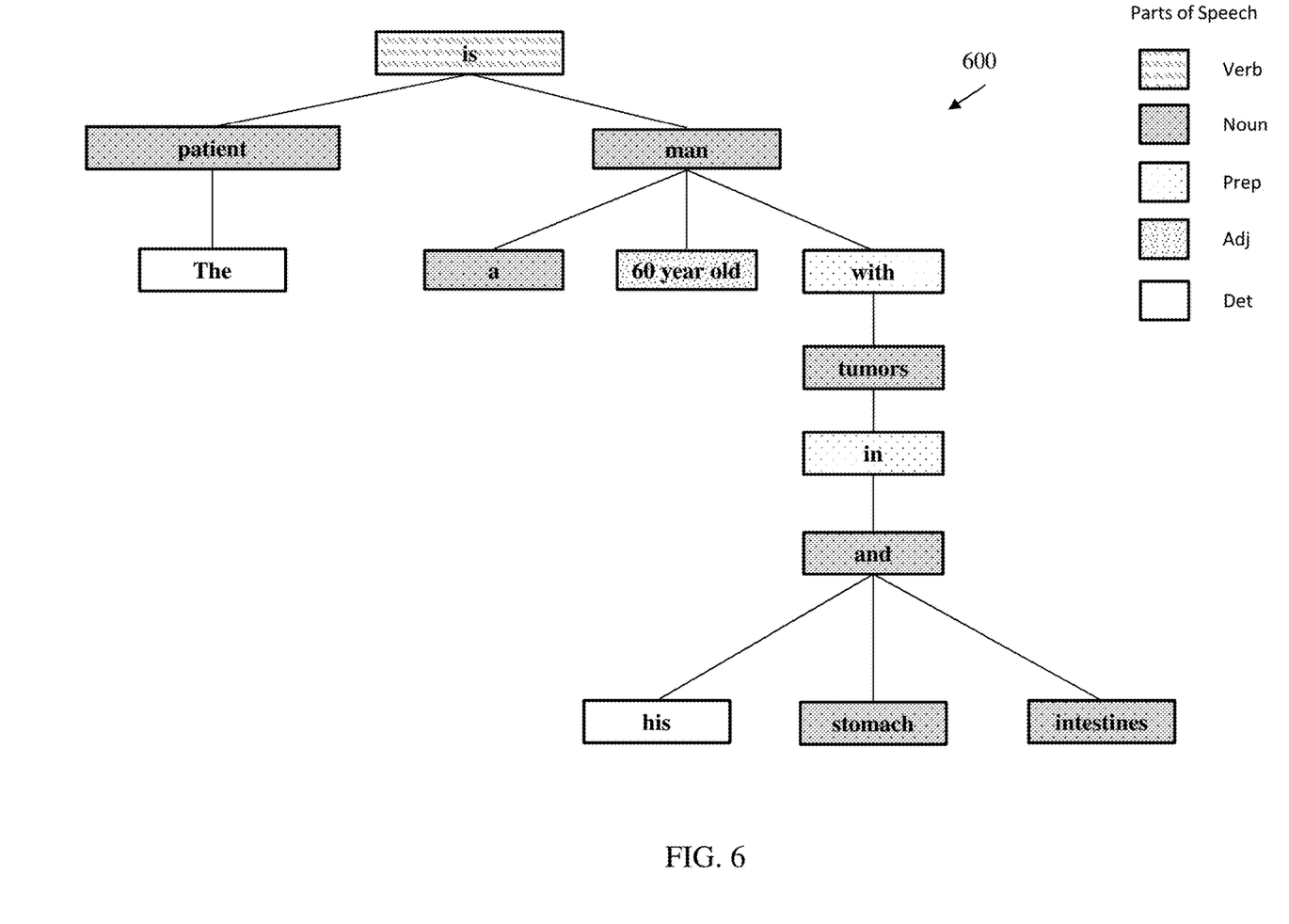
FIG. 6 depicts the results of a parse tree of a medical expression according to one or more embodiments of the invention.

In one or more embodiments of the invention, the system 400 can analyze the following expression: "The patient is a 60 year old man with tumors in his stomach and intestines." In this case, the target concepts are body parts, body systems, and body substances. FIG. 6 depicts the results of a parse tree of a medical expression according to one or more embodiments of the invention. A parser can provide prepositional phrase structure and the concept matching engine 402 can mine the relationships to the target body parts. The modifiers of stomach and intestine can be mapped to tumor.

Figure 7:
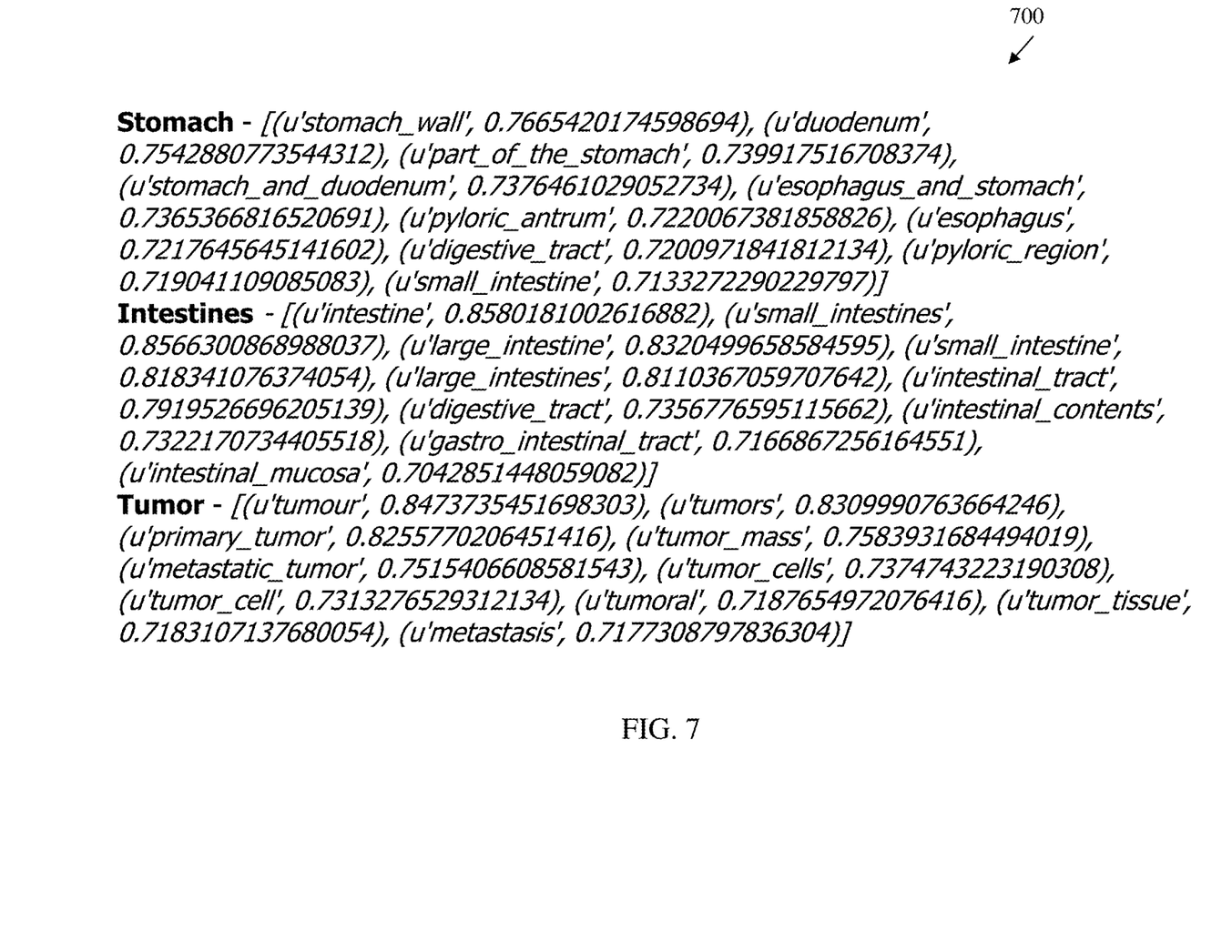
FIG. 7 depicts results of a search in a word embedding space for additional search candidates according to one or more embodiments.

FIG. 7 depicts the results of a search in a word embedding space for additional search candidates according to one or more embodiments. The results 700 include additional search candidates taken from a search for the modifiers (stomach and intestine) and the disease (tumor). As shown, some included additional search candidates for "stomach" include "stomach wall," "duodenum," and "part of the stomach" to name a few. These additional search candidates can be utilized to mine for both the target and modifiers. With the expanded set of search candidates, the concept matching engine 402 can search the cache 420 for any targets (i.e., body parts/body systems) that are an exact match for one of the given candidates or that have a word embedding distance that is less than a threshold distance. A confidence value can be calculated based on the distance a candidate is away from the candidate in the documents 404.

Figure 8:
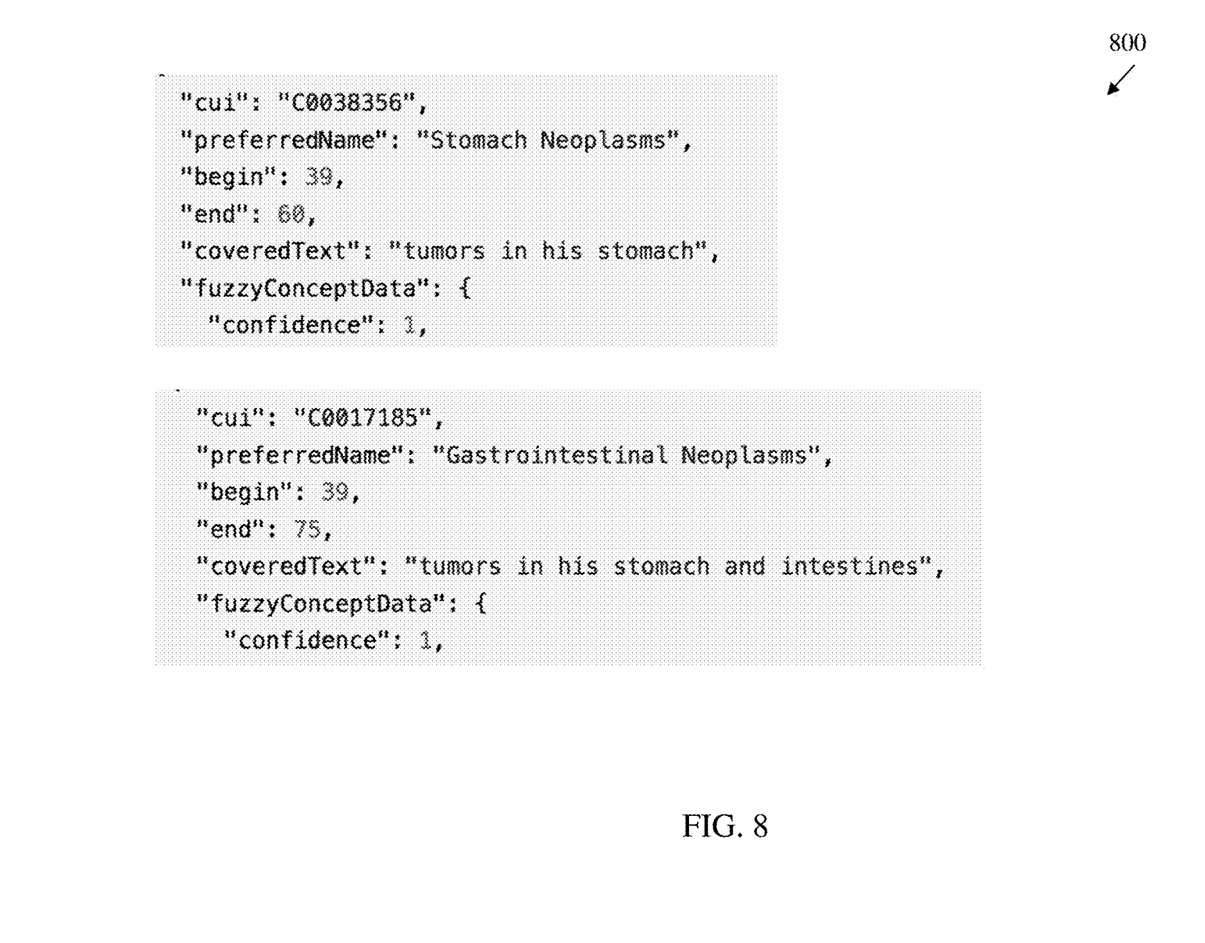
FIG. 8 depicts some exemplary results from the concept matching engine according to one or more embodiments of the invention.

In one or more embodiments of the invention, after comparing all the target/modifier candidate pairs to available options in the cache, the concept matching engine 402 can rank the results and return these results as available annotations if they exceed a threshold confidence rank. FIG. 8 depicts some exemplary results from the concept matching engine according to one or more embodiments of the invention. The results 800 provide a preferred name and also a CUI for the text being searched. The phrase, "tumors in his stomach" returns a CUI of "C0038356" and a preferred name of "Stomach Neoplasms." The phrase "tumors in his stomach and intestines" returns a CUI of "C0017185" and a preferred name of "Gastrointestinal Neoplasms." In the illustrated example in FIG. 8, the matches from the cache 420 have a high confidence score because of the close similarities to the text in the document 404.

In one or more embodiments of the invention, the concept matching engine 402 and NLP engine 406 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In embodiments of the invention, the engines 402, 406 can also be implemented as so-called classifiers (described in more detail below). In one or more embodiments of the invention, the features of the various engines/classifiers (402, 406) described herein can be implemented on the processing system 300 shown in FIG. 3, or can be implemented on a neural network (not shown). In embodiments of the invention, the features of the engines/classifiers 402, 406 can be implemented by configuring and arranging the processing system 300 to execute machine learning (ML) algorithms. In general, ML algorithms, in effect, extract features from received data (e.g., inputs to the engines 402, 406) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402, 406 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402, 406 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

The NLP engine 406 can perform natural language processing (NLP) analysis techniques on the documents 404 as well as the ontology 430. NLP is utilized to derive meaning from natural language. The NLP engine 406 can analyze the documents 404 by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by the concept matching engine 402 to identify potential search results from the ontology 430. These NLP structures include a translation and/or interpretation of the natural language input, including synonymous variants thereof. The NLP engine 406 can analyze the features to determine a context for the features. NLP analysis can be utilized to extract attributes (features) from the natural language. These extracted attributes can be analyzed by the concept matching engine 402 to determine one or more annotations.

Figure 9:
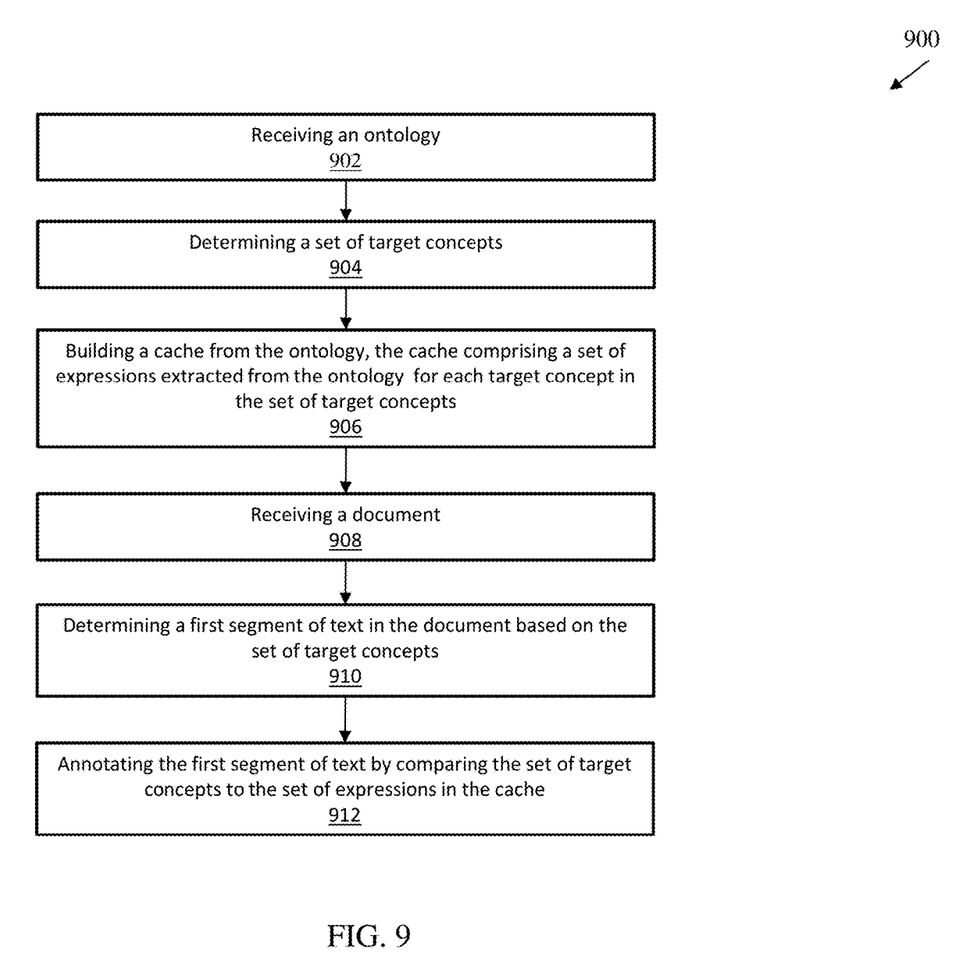
FIG. 9 depicts a flow diagram of a method for expanded concept matching according to one or more embodiments of the invention.

FIG. 9 depicts a flow diagram of a method for expanded concept matching according to one or more embodiments of the invention. The method 900 includes receiving an ontology, as shown in block 902. As mentioned above, the ontology can be a dictionary. For example, the dictionary can be the UMLS or other medical dictionary with a number of concept identifiers. At block 904, the method 900 includes determining a set of target concepts. The target concepts can be determined based on what concepts are of interest or, in medical applications, which are clinically relevant or relevant to insurance coverage. The method 900, at block 906, includes building a cache from the ontology, the cache comprising a set of expressions extracted from the ontology for each target concept in the set of target concepts. The ontology can be data mined to extract the set of expressions that are associated with various CUIs. And at block 908, the method 900 includes receiving a document. The document is unstructured text, for example, a medical record. The method 900, at block 910, includes determining a first segment of text in the document based on the set of target concepts. The first segment typically includes a target concept and parsing rules can be utilized to identify modifiers for the target concept. And at block 912, the method 900 includes annotating the first segment of text by comparing the set of target concepts to the set of expressions in the cache.

Additional processes may also be included. It should be understood that the processes depicted in FIG. 9 represent illustrations, and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for expanded concept matching, the method comprising:
   receiving an ontology;
   determining, utilizing a parse tree, a set of target concepts from an unstructured text, wherein the set of target concepts are based on the ontology;
   building a cache from the ontology based on the set of target concepts, the cache comprising a set of expressions extracted from the ontology for each target concept in the set of target concepts, wherein building the cache comprises:
      analyzing the ontology to determine a set of expanded concepts for each target concept in the set of target concepts, wherein each target concept in the set of target concepts comprises one or more associated modifiers, and wherein each expanded concept in the set of expanded concepts is within a threshold word embedding distance of at least one target concept in the ontology;
      determining a concept unique identifier for each expanded concept in the set of expanded concept;
      determining at least one synonym for an expanded concept in the set of expanded concepts;
   receiving a document;
   determining a first segment of text in the document based on the set of expanded concepts; and
   annotating the first segment of text by comparing the set of expanded concepts to the set of expressions in the cache.

2. The computer-implemented method of claim 1, wherein building the cache further comprises:
   determining at least one antonym for a target in the set of targets.

3. The computer-implemented method of claim 1, wherein building the cache further comprises:
   determining at least one colloquial variant for a target in the set of targets.

4. The computer-implemented method of claim 1, wherein annotating the first segment of text comprises associating a concept unique identifier with at least one expression in the first segment of text.

5. The computer-implemented method of claim 1, wherein the ontology comprises a dictionary.

6. The computer-implemented method of claim 1, wherein the document comprises unstructured text.

7. A system for expanded concept matching comprising:
   a processor communicatively coupled to a memory, the processor configured to:

receive an ontology;

determine, utilizing a parse tree, a set of target concepts from an unstructured text, wherein the set of target concepts are based on the ontology;

build a cache from the ontology based on the set of target concepts, the cache comprising a set of expressions extracted from the ontology for each target concept in the set of target concepts, wherein building the cache comprises:

analyzing the ontology to determine a set of expanded concepts for each target concept in the set of target concepts, wherein each target concept in the set of target concepts comprises one or more associated modifiers, and wherein each expanded concept in the set of expanded concepts is within a threshold word embedding distance of at least one target concept in the ontology;

determining a concept unique identifier for each expanded concept in the set of expanded concept;

determining at least one synonym for an expanded concept in the set of expanded concepts;

receive a document;

determine a first segment of text in the document based on the set of expanded concepts; and annotate the first segment of text by comparing the set of expanded concepts to the set of expressions in the cache.

8. The system of claim 7, wherein building the cache further comprises:

determining at least one antonym for a target in the set of targets.

9. The system of claim 7, wherein building the cache further comprises:

determining at least one colloquial variant for a target in the set of targets.

10. The system of claim 7, wherein annotating the first segment of text comprises associating a concept unique identifier with at least one expression in the first segment of text.

11. A computer program product for expanded concept matching comprising a computer readable storage medium having program instructions embodied therewith, the program instructions executable by a processor to cause the processor to perform a method comprising:

receiving an ontology;

determining, utilizing a parse tree, a set of target concepts from an unstructured text, wherein the set of target concepts are based on the ontology;

building a cache from the ontology based on the set of target concepts, the cache comprising a set of expressions extracted from the ontology for each target concept in the set of target concepts, wherein building the cache comprises:

analyzing the ontology to determine a set of expanded concepts for each target concept in the set of target concepts, wherein each target concept in the set of target concepts comprises one or more associated modifiers, and wherein each expanded concept in the set of expanded concepts is within a threshold word embedding distance of at least one target concept in the ontology;

determining a concept unique identifier for each expanded concept in the set of expanded concept;

determining at least one synonym for an expanded concept in the set of expanded concepts;

receiving a document;

determining a first segment of text in the document based on the set of expanded concepts; and annotating the first segment of text by comparing the set of expanded concepts to the set of expressions in the cache.

12. The computer program product of claim 11, wherein building the cache further comprises:

determining at least one antonym for a target in the set of targets.

13. The computer program product of claim 11, wherein building the cache further comprises:

determining at least one colloquial variant for a target in the set of targets.

14. The computer program product of claim 11, wherein annotating the first segment of text comprises associating a concept unique identifier with at least one expression in the first segment of text.

* * * * *